US012571913B2

(12) United States Patent
Geiger et al.

(10) Patent No.: US 12,571,913 B2
(45) Date of Patent: Mar. 10, 2026

(54) OPTICAL SENSOR MODULES USING POLARIZED LIGHT

(71) Applicant: ams-OSRAM Asia Pacific Pte. Ltd., Singapore (SG)

(72) Inventors: Jens Geiger, Thalwil (CH); Laurent Nevou, Zurich (CH); Gregor Schnitzler, Zollikerberg (CH); Jean-Francois Seurin, Princeton Junction, NJ (US); Karl Ilzer, Graz (AT)

(73) Assignee: ams-OSRAM Asia Pacific Pte. Ltd., Singapore (SG)

( * ) Notice: Subject to any disclaimer, the term of this patent is extended or adjusted under 35 U.S.C. 154(b) by 1078 days.

(21) Appl. No.: 17/437,918

(22) PCT Filed: Mar. 26, 2020

(86) PCT No.: PCT/SG2020/050172
§ 371 (c)(1),
(2) Date: Sep. 10, 2021

(87) PCT Pub. No.: WO2020/204818
PCT Pub. Date: Oct. 8, 2020

(65) Prior Publication Data
US 2022/0128688 A1 Apr. 28, 2022

Related U.S. Application Data

(60) Provisional application No. 62/827,967, filed on Apr. 2, 2019.

(51) Int. Cl.
| | |
|---|---|
| *G01S 17/04* | (2020.01) |
| *G01S 7/481* | (2006.01) |
| *G02B 5/30* | (2006.01) |

(52) U.S. Cl.
CPC ............ *G01S 17/04* (2020.01); *G01S 7/4814* (2013.01); *G02B 5/3025* (2013.01)

(58) Field of Classification Search
CPC .................. G01S 17/04; G01S 7/4814; G01S 2007/4975; G01S 7/499; G01S 7/4808; G02B 5/3025
See application file for complete search history.

(56) References Cited

U.S. PATENT DOCUMENTS

| | | |
|---|---|---|
| 2009/0108185 A1 | 4/2009 | Hoersch et al. |
| 2015/0311673 A1 | 10/2015 | Wang et al. |

(Continued)

FOREIGN PATENT DOCUMENTS

| | | |
|---|---|---|
| CN | 105181130 A | 12/2015 |
| CN | 106464383 A | 2/2017 |

(Continued)

OTHER PUBLICATIONS

International Search Report with Written Opinion for related Application No. PCT/SG2020/050172 dated Jul. 13, 2020 (12 Pages).

(Continued)

*Primary Examiner* — Thanh Luu
*Assistant Examiner* — Mai Thi Ngoc Tran
(74) *Attorney, Agent, or Firm* — Viering, Jentschura & Partner mbB

(57) ABSTRACT

An optical sensor module uses polarized light such that, in some instances, crosstalk effects caused by light reflected from a cover glass or from a thin smudge layer on the cover glass can be eliminated, or at least reduced, by directing light of a first polarization through the cover glass toward a target and selectively detecting, in the module, light of a second polarization that is orthogonal to the first polarization.

18 Claims, 5 Drawing Sheets

(56) References Cited

U.S. PATENT DOCUMENTS

| | | | |
|---|---|---|---|
| 2016/0013223 A1* | 1/2016 | Chang | G01S 7/499 |
| | | | 257/432 |
| 2017/0019181 A1 | 1/2017 | Flintham et al. | |
| 2017/0256915 A1* | 9/2017 | Ghosh | H01S 5/1833 |
| 2018/0120714 A1 | 5/2018 | Zijp et al. | |
| 2020/0386892 A1* | 12/2020 | Kotov | G01S 7/4802 |

FOREIGN PATENT DOCUMENTS

| | | |
|---|---|---|
| CN | 106871990 A | 6/2017 |
| CN | 107567584 A | 1/2018 |
| DE | 102006053229 A1 | 5/2008 |

OTHER PUBLICATIONS

First Search issued for the corresponding Chinese patent application No. 2020800266371, dated Oct. 12, 2023, 1 page (for informational purpose only).

Examintaion Report for parallel CN Application 202080026637.1, dated Aug. 12, 2024, 17 pages (for reference purpose only).

German office action issued for the corresponding German patent application No. 102020001719.2, dated Jun. 2, 2025, 6 pages (for informational purposes only).

Guillaumee, M., et al., "Polarization sensitive silicon photodiodes using nanostructured metallic grids", Applied Physics Letters, Issue 94, 2009, DOI: 10.1063/1.3133862, pp. 193503-1-193503-3.

* cited by examiner

Legend:

Polarization
in the paper plane
↔

Polarization
perpendicular to the paper plane
⊙ unpolarized /
low degree of polarization
↔⊙

204

202 y x

OPTICAL SENSOR MODULES USING POLARIZED LIGHT

FIELD OF THE DISCLOSURE

This disclosure relates to optical sensor modules that use polarized light.

BACKGROUND

Some handheld computing devices such as smartphones can provide a variety of different optical functions such as one-dimensional (1D) or three-dimensional (3D) gesture detection, 3D imaging, time-of-flight or proximity detection, ambient light sensing, and/or front-facing two-dimensional (2D) camera imaging.

Optical proximity sensing systems, for example, are based on emitted light, which is reflected by one or more objects in a scene. The reflected light is detected by a sensor, and photo-generated electrons are analyzed to determine, for example, whether an object is present in close proximity.

SUMMARY

The present disclosure describes optical sensor modules that use polarized light. In some instances, crosstalk effects caused by light reflected from a cover glass or from a thin smudge layer on the cover glass can be eliminated, or at least reduced, by directing light of a first polarization through the cover glass toward a target and selectively detecting, in the module, light of a second polarization that is orthogonal to the first polarization.

For example, in one aspect, the present disclosure describes an apparatus including an optical module. The optical module includes an emission channel and a detection channel. The emission channel is operable to emit light having a first polarization. The emission channel includes a light emitter operable to produce light at one wavelength. The detection channel is operable selectively to detect light of a second polarization that is orthogonal to the first polarization. The detection channel includes a light receiver operable to detect light at the same wavelength as the emitter.

Some implementations include one or more of the following features. For example, in some instances, the apparatus includes a cover glass, and the optical module is operable such that at least some of the light produced by the light emitter is transmitted through the cover glass, and such that at least some of the light transmitted through the cover glass and reflected by an object back toward the module through the cover glass is detected by the light receiver. In some cases, the emission channel is operable to emit light having a first linear polarization, and the detection channel is operable selectively to detect light of a second linear polarization that is orthogonal to the first linear polarization. In some implementations, the emission channel is operable to emit light having a first circular polarization, and the detection channel is operable selectively to detect light of a second circular polarization that is orthogonal to the first circular polarization.

In some instances, the apparatus includes a polarizer disposed in the emission channel so as to intersect light produced by the light emitter. In some cases, the light emitter includes an optical polarizer integrated as part of the light emitter. The light emitter can include, for example, a VCSEL structure having an asymmetric aperture, a reflection grating, or a sub-wavelength reflection grating. In some instances, the apparatus includes a polarization analyzer operable to selectively allow only light having the second polarization to pass for detection by the light receiver. In some implementations, the light receiver includes an optical polarizer integrated as part of the light receiver. In some cases, the optical module is disposed behind a cover glass of a portable computing device.

The present disclosure also describes a method that includes transmitting, from an optical module, light through a cover glass of a portable computing device toward an object, wherein the light emitted through the cover glass has a first polarization. The method includes receiving, in the module, light reflected by the object and passing through the cover glass, wherein the light reflected by the object includes light having the first polarization and light having a second polarization that is orthogonal to the first polarization. The method further includes selectively detecting, in the module, light reflected by the object and having the second polarization.

Some implementations include one or more of the following features. For example, in some cases, the method includes converting light emitted by a light emitting element into polarized light having the first polarization, wherein the converting occurs before transmitting the light through the cover glass. In some instances, the method includes selectively blocking light that was reflected by the object and passed through the cover glass, wherein the blocked light has the first polarization, and wherein the blocking occurs before detecting the light having the second polarization.

In some implementations, the light transmitted through the cover glass has a first linear polarization, and the selectively detected light has a second linear polarization that is orthogonal to the first linear polarization. In some implementations, the light transmitted through the cover glass has a first circular polarization, and the selectively detected light has a second circular polarization that is orthogonal to the first circular polarization.

In some cases, the cover glass reflects some light having the first polarization back into the module, and the method includes blocking the light reflected by cover glass before detecting the light having the second polarization.

The method can include, for example, using the light detected in the module for proximity sensing or other applications.

Other aspects, features and various advantages will be readily apparent from the following detailed description, the accompanying drawings, and the claims.

DETAILED DESCRIPTION

Figure 1:
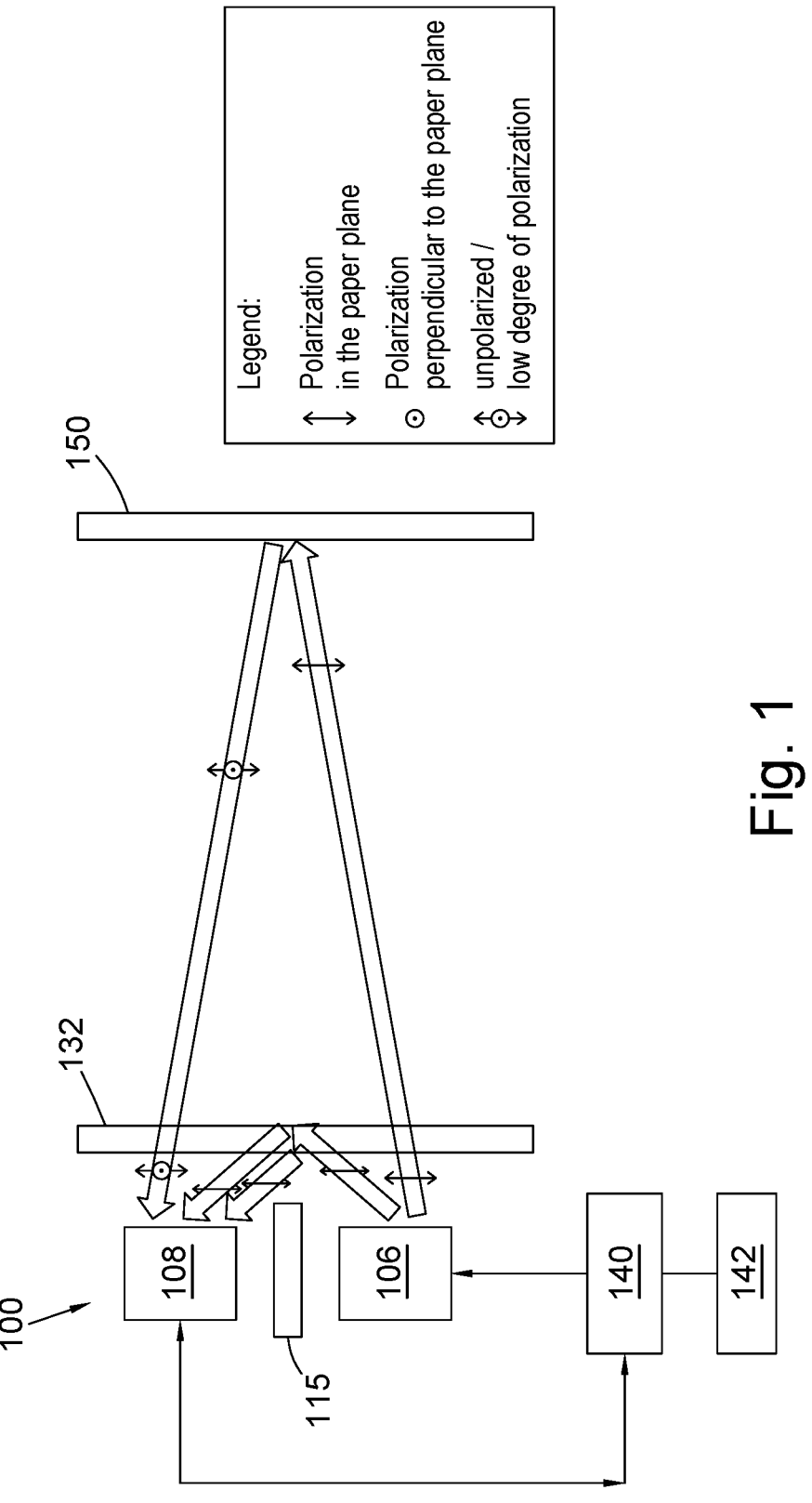
FIG. 1 illustrates an example of an optoelectronic module.

FIG. 1 illustrates an example of an optoelectronic module 100 that includes a light emission channel and a light detection channel. A light emitter 106 and a light receiver 108 can be mounted, for example, on a printed circuit board (PCB) or other substrate. The light emitter 106 is operable to emit light at a particular wavelength or range of wavelengths. In some implementations, the light emitter 106 is implemented as one or more laser diodes or vertical cavity surface emitting lasers (VCSELs).

In some cases, an interior wall 115 provides optical isolation between the module's two chambers (i.e., the light emission chamber (channel) and the light detection chamber (channel)). An optics member can include one or more respective passive optical elements (e.g., lenses) for each channel. Light from the emitter 106 is directed out of the module 100 and, if reflected by an object 150 back toward the module's detection channel, can be sensed by the light receiver 108.

The light receiver 108 can include, for example, a photodetector (e.g., a photodiode or an array of spatially distributed light sensitive elements (e.g., pixels)), and also may include logic and other electronics to read and process signals from the photodetector. The pixels and other circuitry can be implemented, for example, in an integrated semiconductor chip.

The emitter 106 and the light receiver 108 can be connected electrically to the PCB, for example, by conductive pads or wire bonds. The PCB, in turn, can be connected electrically to other components within a host device (e.g., a smartphone). The design of smart phones and other portable computing devices referenced in this disclosure can include one or more processors, one or more memories (e.g. RANI), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

The sensor's control and processing circuitry (e.g., an electronic control circuit) 140 can be implemented, for example, as one or more integrated circuits in one or more semiconductor chips with appropriate digital logic and/or other hardware components (e.g., read-out registers; amplifiers; analog-to-digital converters; clock drivers; timing logic; signal processing circuitry; and/or a microprocessor). The control and processing circuitry 140, and associated memory 142, may reside in the same semiconductor chip as the light receiver 108 or in one or more other semiconductor chips. In some instances, the control and processing circuitry 140 may be external to the module 100; for example, the control and processing circuitry can be integrated into a processor for the host device in which the module 100 is disposed.

In some cases, the host device (e.g., a smart phone or other portable computing device) into which the module 100 is integrated includes a transmissive cover (e.g., a cover glass) 132 under which the module 100 is disposed. The cover glass 132 may create light reflections from both its surfaces, and in some cases, the reflected light may hit the light receiver 108, thereby creating a background signal (i.e., cover glass crosstalk) that may deteriorate the signal of the optical sensor. Additionally, a smudge (i.e., a blurred or smeared mark such as a fingerprint or dirt, or other contamination) may be present on the cover glass 132. The smudge may scatter the emitter light, thereby creating an additional background signal (smudge crosstalk). Further, the smudge crosstalk may vary over time, for example, as the amount of dirt and its distribution change.

The inventors of the present disclosure realized that, in some instances, the polarization of the light from the emitter 106 is substantially preserved when it is reflected by the polished surface of the cover glass or scattered by a thin smudge layer, whereas the polarization of the emitter light is scrambled into un-polarized light when it impinges on certain targets such as skin or other volume scattering targets (i.e., targets into which the emitter light penetrates). Thus, the crosstalk effects caused by light reflected from the cover glass or from a smudge on the cover glass can be eliminated, or at least reduced, by directing light of a first polarization through the cover glass toward the target and selectively detecting, in the module, light of a second polarization that is orthogonal to the first polarization.

Figure 2:
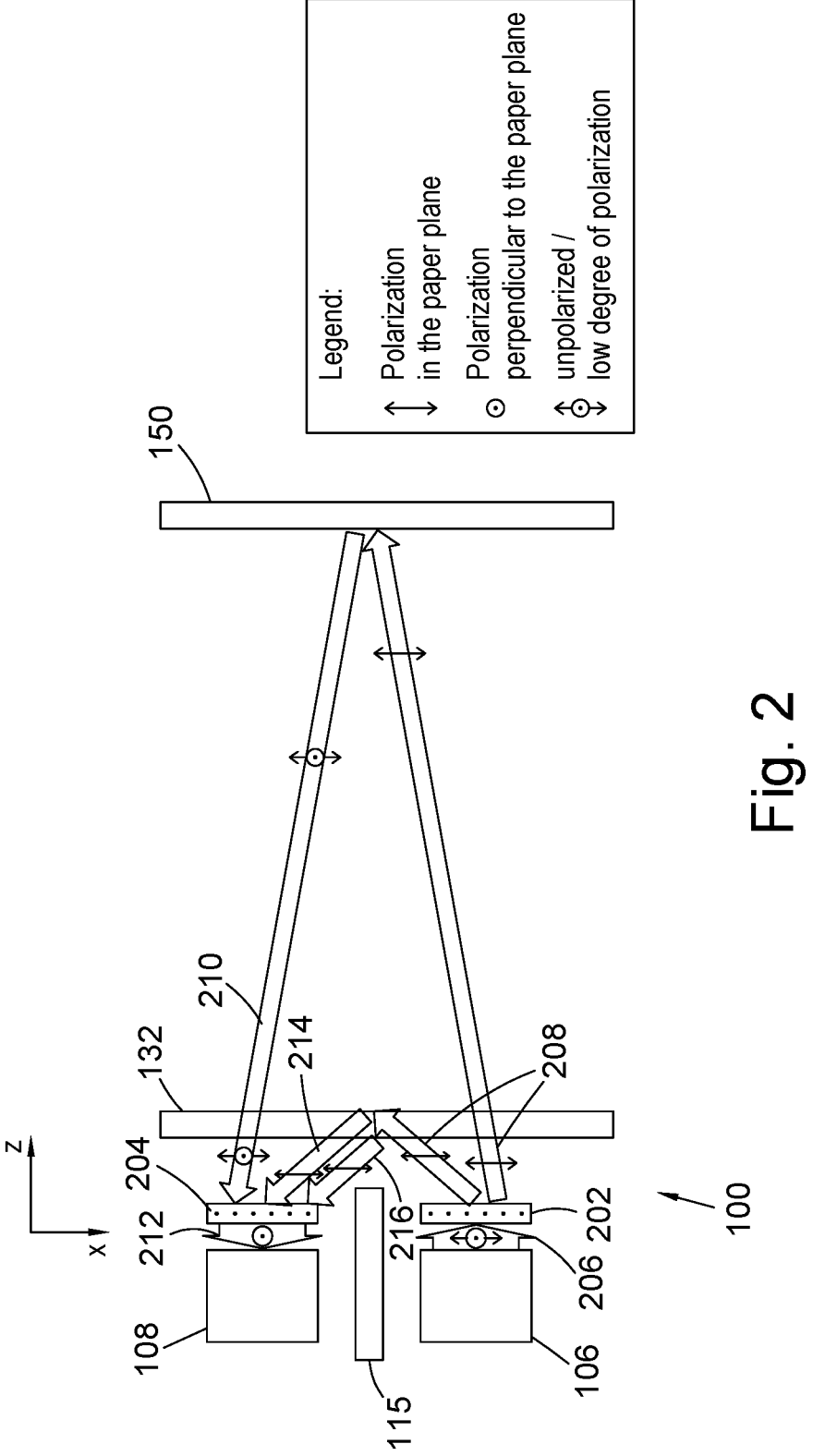
FIG. 2 illustrates a first example of an optoelectronic module using polarized light.

An example is illustrated in FIG. 2, which includes a first polarizer 202 disposed over the emitter 106 so to intersect the path of light from the emitter 106. The first polarizer 202 is operable as an optical filter that lets light waves of a specific polarization pass through while blocking light waves of other polarizations. Thus, the first polarizer 202 can filter a beam 206 of light emitted by the emitter 106 and having undefined or mixed polarization into a beam 208 of light having well-defined polarization. In some implementations, the first polarizer 202 is a linear polarizer, although in some cases it may be a circular polarizer.

Figure 3:
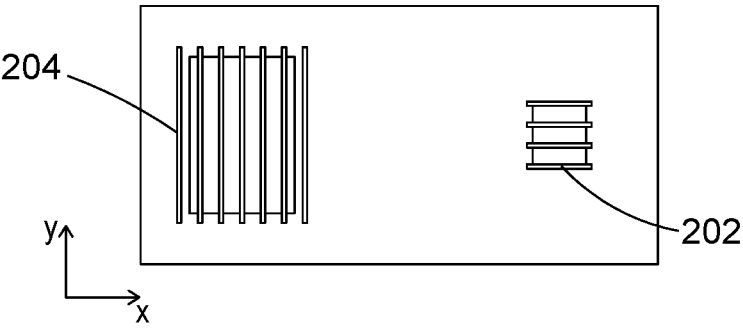
FIG. 3 illustrates an example of polarization orientations for the emission and detection channels of the optoelectronic module of FIG. 2.

A second polarizer 204, which can be referred to as a polarization analyzer, is operable to block all light except for light having a polarization that is orthogonal to the light passed by the first polarizer 202. FIG. 3 illustrates an example of the polarizers 202, 204 implemented as linear polarizers and shows that the polarization orientations of the first and second polarizers 202, 204 are orthogonal to one another. If the polarizers 202, 204 are implemented as circular polarizers, then one polarizer can have right-handed orientation, and the other polarizer can have a left-handed orientation.

In operation, the un-polarized light 206 produced by the emitter 106 is polarized into light 208 having a first polarization orientation. Most of the light 208 passes through the cover glass 132 and some of that light 208 may be reflected by an object 150 back toward the module 100. In many cases, the object 150 scrambles the incident light 208 into un-polarized reflected light 210. As shown in FIG. 2, some of the reflected light 210 passes through the cover glass 132 toward the light receiver 108. The polarization analyzer 204 selectively allows only light 212 having a polarization orientation orthogonal to that of the light 208 to pass for detection by the light receiver 108. The detected signal can be used for proximity sensing or other purposes.

Some of the polarized light 208 incident on the cover glass 132 may be reflected by one of the cover glass surfaces (or scattered by a thin smudge layer on the surface of the cover glass). Such reflected (or scattered) light 214, 216 substantially preserves the polarization of the light 208. Thus, most or all of the reflected (or scattered) light 214, 216 will not pass through the polarization analyzer 204 and thus will not be detected by the light receiver 108. In this manner, the crosstalk effects caused by light reflected from the cover glass 132 or scattered by a smudge on the cover glass can be eliminated, or at least strongly reduced.

Preferably the polarization of the light emitted out of the module is aligned such that the light beams 208 produced for transmission out of the module 100 are p-polarized with respect to the cover glass 132. The transmission of the cover glass can be much better using p-polarized light than with s-polarized light. Furthermore, at the Brewster angle, no p-polarized light is reflected from the cover glass surface. Thus, the amount of light reflected by the cover glass 132 back toward the receiver 108 can be reduced further by using p-polarized light.

In some instances, each of the polarizers 202, 204 is implemented as a grating. For circular polarizers, a quarter-wave plate can be placed after a linear polarizer such that the transmission axis of the linear polarizer is half way (i.e., 45°) between the fast and slow axes of the quarter-wave plate.

Figure 4:
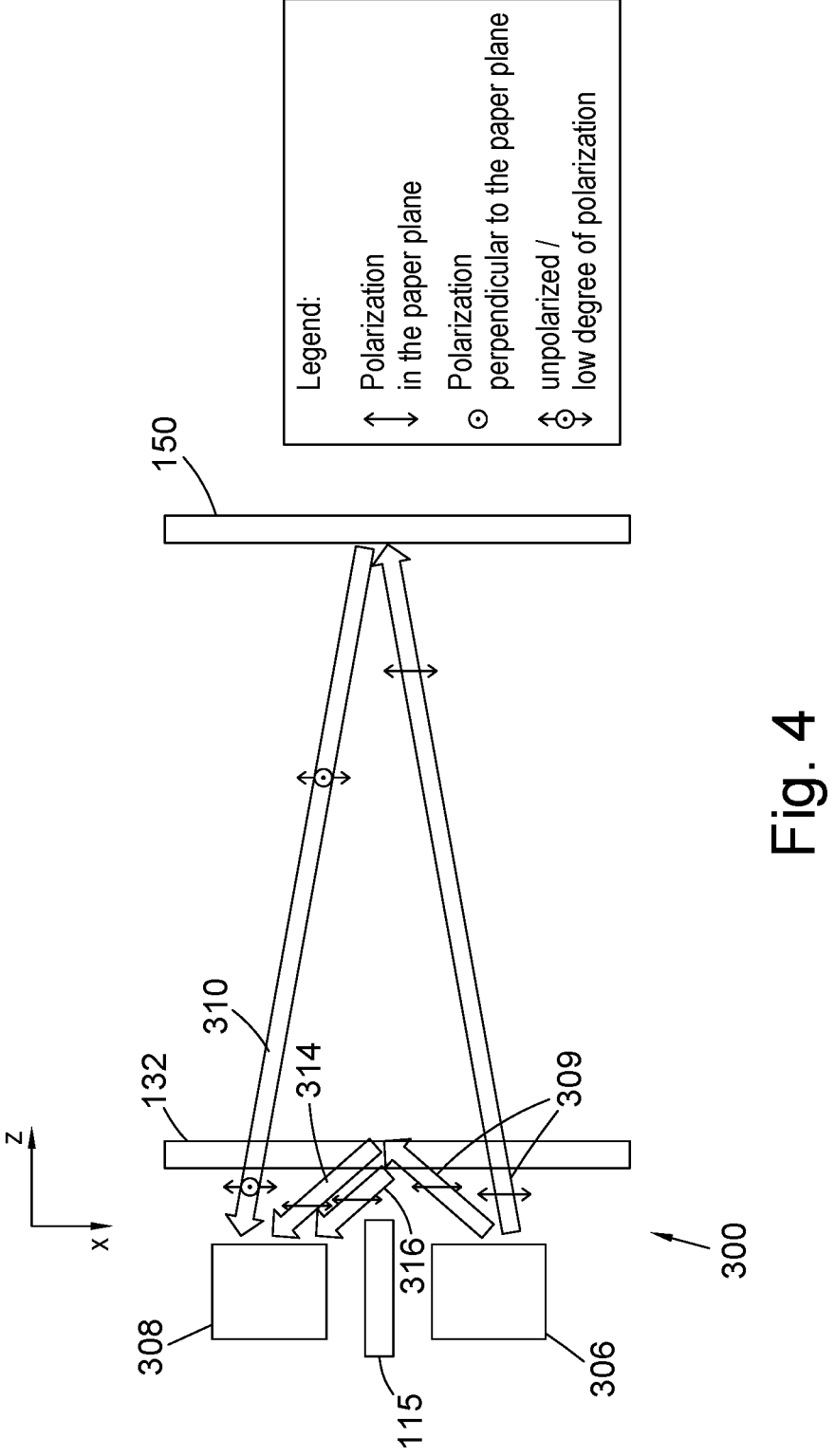
FIG. 4 illustrates a second example of an optoelectronic module using polarized light.

In some instances, the optical polarizers can be integrated as part of the light emitter and light receiver, respectively, rather than being elements separate from the emitter and receiver. As shown in FIG. 4, a module 200 includes a polarized light emitter 306 and a polarization sensitive receiver 308. In this case, the polarization orientation of the light 309 produced by emitter 306 is orthogonal to the polarization orientation of the light detected by the receiver 308.

In operation, most of the polarized light 309 produced by the emitter 306 passes through the cover glass 132 and some of that light 309 may be reflected by an object 150 back toward the module 300. In many cases, the object 150 scrambles the incident light 309 into un-polarized reflected light 310. As shown in FIG. 3, some of the reflected light 310 passes through the cover glass 132 toward the light receiver 308, which selectively detects only light having a polarization orientation orthogonal to that of the light 309. The detected signal can be used for proximity sensing or other purposes.

Some of the polarized light 309 incident on the cover glass 132 may be reflected by one of the cover glass surfaces (or scattered by a thin smudge layer on the surface of the cover glass). Such reflected (or scattered) light 314, 316 substantially preserves the polarization of the light 208. Thus, most or all of the reflected (or scattered) light 314, 316 will not be detected by the light receiver 308. In this manner, the crosstalk effects caused by light reflected from the cover glass 132 or scattered by a smudge on the cover glass can be eliminated, or at least reduced.

Various VCSEL structures, for example, can be used to produce linear polarized light. Thus, in some instances, the VCSEL structure includes an asymmetric aperture. For example, the VCSEL structure can have an oval cross-section gain section so that the VCSEL device operates with an oval-shaped beam. The oval structure results in asymmetric thermal and electrical stress applied to the VCSEL crystal structure, which results in a refractive index asymmetry. This optical asymmetry causes the VCSEL to lase in a linear polarization aligned to the refractive index asymmetry.

In other implementations, the VCSEL structure operable to produce linear polarized light includes one or more reflection gratings. These structures can, in some cases, produce a substantially symmetrical, round output light beam (i.e., a beam having a round, or substantially round, cross-section). The VCSELs can be top-emitting or bottom-emitting. In some implementations, the reflection grating is functionally combined with a distributed Bragg reflector (DBR). In other cases, the reflection grating advantageously can be used even in the absence of an associated DBR.

In yet other implementations, the VCSEL structure operable to produce linear polarized light includes a sub-wavelength reflection grating.

Further, in some cases, instead of providing only a single VCSEL as the emitter 106, 306, an array of VCSELs can be provided as the emitter.

Figure 5:
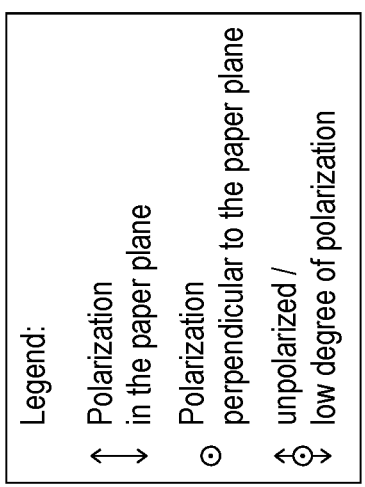
FIG. 5 illustrates a third example of an optoelectronic module using polarized light.
Figure 5:
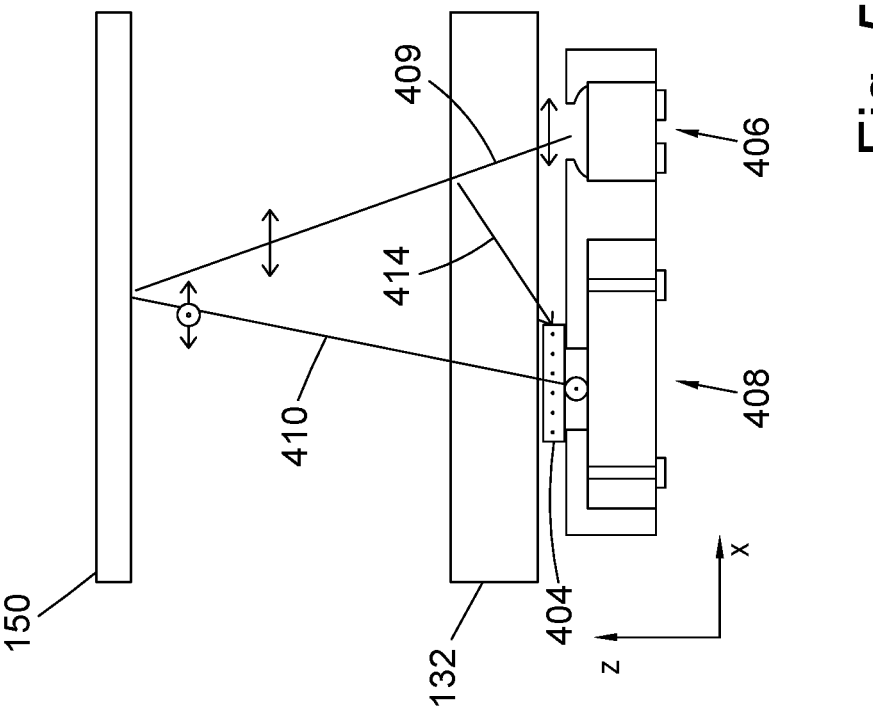

In some implementations, one of the light emitter or light receiver has a separate polarizer associated with it, whereas the other one of the light emitter or light receiver has an integrated optical polarizer. FIG. 5 illustrates an example in which the light emitter 406 is implemented as a VCSEL that produces polarized light, whereas a polarization analyzer 404 is disposed in front of the light receiver 408. In operation, most of the polarized light 409 produced by the emitter 406 passes through the cover glass 132 and some of that light 409 may be reflected by an object 150 back toward the module 400. In many cases, the object 150 scrambles the incident light 409 into un-polarized reflected light 410. As shown in FIG. 5, some of the reflected light 410 passes through the cover glass 132 toward the light receiver 408. The polarization analyzer 404 selectively allows only light 412 having a polarization orientation orthogonal to that of the light 409 to pass for detection by the light receiver 408. The detected signal can be used for proximity sensing or other purposes.

Some of the polarized light 409 incident on the cover glass 132 may be reflected by one of the cover glass surfaces (or scattered by a thin smudge layer on the surface of the cover glass). Such reflected (or scattered) light 414 substantially preserves the polarization of the light 409. Thus, most or all of the reflected (or scattered) light 414 will not be detected by the light receiver 408. In this manner, the crosstalk effects caused by light reflected from the cover glass 132 or scattered by a thin smudge layer on the cover glass can be eliminated, or at least reduced.

In the foregoing examples, the module is configured such that the light receiver selectively detects only light having a polarization orientation that is orthogonal to the polarization orientation of the light produced for transmission out of the module. In some cases, it can be advantageous for the receiver to detect separately both polarizations of light (i.e., light having a polarization orientation that is orthogonal to the polarization orientation of the light produced for transmission out of the module, as well as light having a polarization orientation that is parallel to the polarization orientation of the light produced for transmission out of the module). This can be achieved, for example, by providing two light detectors having crossed polarizers and creating current signals on respective sensor gates for each of the two orthogonal polarizations. Although the light in the parallel polarization may contain light reflected from the cover glass, it still may be useful for objects located at greater distances.

In some applications, the cover glass may affect the polarization, for example, by changing the state of the light's polarization (e.g., from a linear state to a circular state). In such cases, the system can be configured to compensate for such changes. For example, the axis of polarization of the emitter can be aligned such that the optical transmission through the cover glass is maximized (e.g., parallel to the axis of transmission in the case of a polarizer). In some cases, the state of polarization of the emitter can be selected such that the reflections from the cover glass and the target object can be differentiated optimally. For example, if the cover glass acts as a quarter-wave-plate and the receiver employs a linear polarizer, then the emitter can be configured to emit circularly polarized light such that the reflection from the cover glass is polarized perpendicular to the linear polarizer of the receiver, and thus absorbed by the polarizer.

The techniques described in this disclosure can help improve optical proximity sensing. In general, a proximity sensor detects the presence of a nearby object without any physical contact. The proximity sensor emits a beam of electromagnetic radiation (e.g., infrared light) and looks for changes in the detected return signal. For example, in the context of mobile devices such as smartphones, proximity sensing can be used such that when a target is within a nominal range, the device emerges from a low power or sleep mode. Once the device has awoken from the sleep mode, if the proximity sensor's target is still for an extended period of time, the sensor will ignore it, and the device will eventually revert into sleep mode. Thus, for example, during a telephone call, proximity sensors can play a role in detecting, and ignoring, accidental touchscreen taps when the mobile device is held to the user's ear. The modules described in this disclosure can, in some instances, provide improved performance.

The techniques described in this disclosure also can be used for other types of optical sensing, for example, to recognize air gestures and hover-manipulations. Further, the techniques can be used for other types of optical sensors, such as spectral sensors, optical distance sensors, and imaging sensors.

A number of implementations have been described. Nevertheless, various modifications may be made without departing from the spirit of the invention. For example, features described in connection with different embodiments may be combined into a single implementation. Accordingly, other implementations are within the scope of the claims.

The invention claimed is:

1. An apparatus comprising:
an optical module including:
  an emission channel operable to emit light having a first polarization, the emission channel including a light emitter operable to produce light;
  a detection channel including:
    a light receiver including:
    a first light detector operable to selectively detect light of a second polarization that is orthogonal to the first polarization having a same wavelength as the light emitted by the light emitter; and
    a second light detector operable to selectively detect light of the first polarization having the same wavelength as the light emitted by the light emitter;
    a first optical polarizer configured to allow only light of the second polarization to pass to the first light detector,
    wherein the first optical polarizer is a linear polarizer; and
    a second optical polarizer configured to allow only light of the first polarization to pass to the second light detector; and
  a cover glass configured to change the state of the emitted light from a linear state to a circular state, wherein the optical module is operable such that at least some of the light produced by the light emitter is transmitted through the cover glass, and such that at least some of the light transmitted through the cover glass and reflected by an object back toward the optical module through the cover glass is detected by the light receiver,
  wherein an axis of polarization of the light emitter is parallel to an axis of transmission of the second optical polarizer and the first optical polarizer is configured to absorb reflected light that is reflected from the cover glass.

2. The apparatus of claim 1, wherein the emission channel is operable to emit light having a first linear polarization, and the first light detector is operable to selectively detect light of a second linear polarization that is orthogonal to the first linear polarization; or wherein the emission channel is operable to emit light having a first circular polarization, and the first light detector is operable to selectively detect light of a second circular polarization that is orthogonal to the first circular polarization.

3. The apparatus of claim 1, including a third optical polarizer disposed in the emission channel so as to intersect light produced by the light emitter.

4. The apparatus of claim 1, wherein the light emitter includes a third optical polarizer integrated as part of the light emitter.

5. The apparatus of claim 1, wherein the light emitter includes a VCSEL structure having an asymmetric aperture.

6. The apparatus of claim 1, wherein the light emitter includes a VCSEL structure having a reflection grating.

7. The apparatus of claim 1, wherein the light emitter includes a VCSEL structure having a sub-wavelength reflection grating.

8. The apparatus of claim 1, wherein the first optical polarizer and the second optical polarizer are integrated as part of the light receiver.

9. The apparatus of claim 1, wherein the optical module is disposed behind a cover glass of a portable computing device.

10. A method comprising:
emitting, from an optical module, light through a cover glass of a portable computing device toward an object, wherein the light emitted through the cover glass a first linear polarization;
orienting the cover glass to change the state of the emitted light from a linear state to a circular state, such that at least some of the light emitted from the optical module is transmitted through the cover glass, and such that at least some of the light is transmitted through the cover glass and reflected by the object back toward the optical module through the cover glass;
receiving, in the optical module, the light reflected by the object and passing through the cover glass, wherein the light reflected by the object includes light having the first linear polarization and light having a second polarization that is orthogonal to the first linear polarization;
selectively detecting, through a first light detector in the optical module, light reflected by the object and having the second polarization and a same wavelength as the light emitted from the optical module, wherein a first optical polarizer allows only light of the second polarization to pass to the first light detector and wherein the first optical polarizer absorbs light reflected by the cover glass; and
selectively detecting, through a second light detector in the optical module, light having the first polarization and the same wavelength as the light emitted from the optical module, wherein a second optical polarizer allows only light of the first polarization to pass to the second light detector,
wherein an axis of polarization of light emitted from the optical module is parallel to an axis of transmission of the second optical polarizer.

11. The method of claim 10, including converting light emitted by a light emitting element into polarized light having the first polarization, wherein the converting occurs before transmitting the light through the cover glass.

12. The method of claim 10, including selectively blocking light that was reflected by the object and passed through the cover glass, wherein the blocked light has the first polarization, and wherein the blocking occurs before detecting the light having the second polarization.

13. The method of claim 10, wherein the light transmitted through the cover glass has a first linear polarization.

14. The method of claim 13, wherein the selectively detected light has a second linear polarization that is orthogonal to the first linear polarization.

15. The method of claim 10, wherein the light transmitted through the cover glass has a first circular polarization.

16. The method of claim 15, wherein the selectively detected light has a second circular polarization that is orthogonal to the first circular polarization.

17. The method of claim 10, wherein the cover glass reflects some light having the first polarization back into the optical module, the method including blocking the light reflected by cover glass before detecting the light having the second polarization.

18. The method of claim 10, including using the light detected in the optical module for proximity sensing.

* * * * *